Aug. 12, 1969  E. O. SCHMIDT ET AL  3,460,846
PISTON RING
Filed Feb. 9, 1967
2 Sheets-Sheet 1
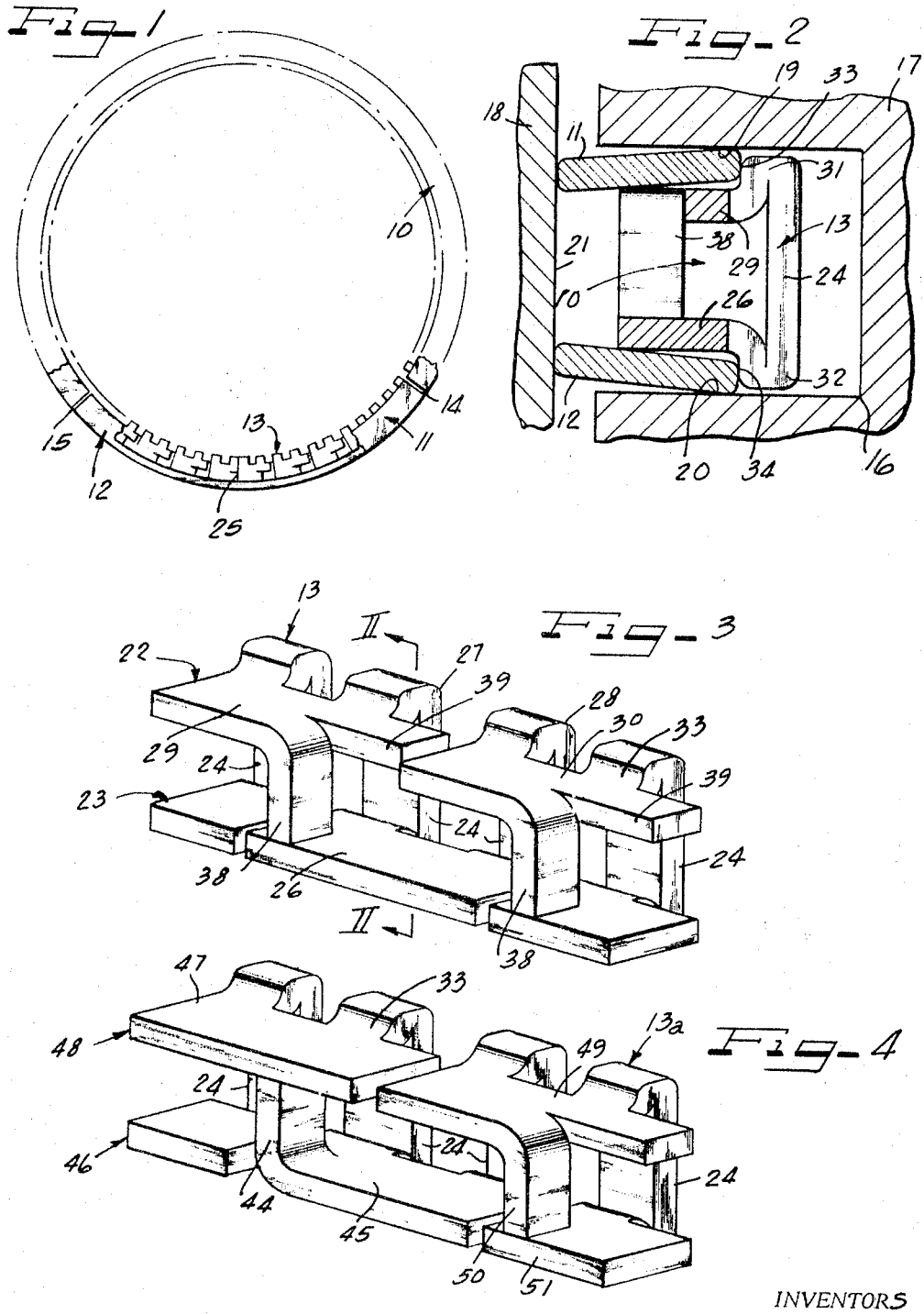
INVENTORS
EARL O. SCHMIDT
ROY D. ANDERSON
BY
ATTORNEYS Aug. 12, 1969    E. O. SCHMIDT ET AL    3,460,846
PISTON RING
Filed Feb. 9, 1967    2 Sheets-Sheet 2

INVENTORS
EARL O. SCHMIDT
ROY D. ANDERSON
BY
ATTORNEYS

United States Patent Office

3,460,846
Patented Aug. 12, 1969

3,460,846
PISTON RING
Earl O. Schmidt, Fenton, and Roy D. Anderson, Ballwin, Mo., assignors to Ramsey Corporation, St. Louis, Mo., a corporation of Ohio
Filed Feb. 9, 1967, Ser. No. 614,854
Int. Cl. F16j 9/06, 9/20
U.S. Cl. 277—140                                                6 Claims

ABSTRACT OF THE DISCLOSURE

A piston oil ring assembly having axially spaced rail rings supported and expanded by a circumferential expander-spacer ring of substantially U-shaped cross-section having circumferentially spaced axially upstanding fingers between the legs of the U to add axial rigidity to the expander-spacer and to block the channel of the U against entry of the rail rings.

BACKGROUND OF THE INVENTION

Field of the invention

The invention relates to piston rings and more particularly relates to a packing ring for an oil control assembly having thin rail rings and an expander-spacer ring. The invention provides an expander-spacer ring of primarily U-shaped cross-section having circumferentially spaced axially upstanding fingers or tangs blocking the channel of the U.

The fingers or tangs of this invention are formed from portions of the radial legs or segments of the U-shaped cross-section expander-spacer ring, which portions are positioned in axial relation to the legs and are circumferentially spaced around the channel of the ring.

Description of prior art

Heretofore, channel type expander-spacer rings for packing ring assemblies or the like for use on a piston such as will be found in internal combustion engines had continuously open channels between the top and bottom ring spacing legs, such as can be seen, for example, in U.S. Patent 2,768,038. During installation of the ring assembly, the rings to be supported and expanded had a tendency to fall into such open channels rather than resting on the outer faces of the ring spacing legs. Further, such open channels provide no axial support to the spacer legs which could, therefore, collapse during installation or flex excessively during high speed operation of the piston, thus increasing the flip-flop or paint brushing of the outer ring.

The present invention avoids the deficiencies of the prior art in providing fingers or tangs between the spacer legs, which fingers or tangs act to block the channel while imparting axial rigidity to the legs without substantially interfering with oil drainage.

SUMMARY

The nature and gist of the invention is the provision of circumferentially spaced axial fingers between the axially spaced legs of a U-shaped circumferential expander ring.

An expander-spacer ring incorporating the principles of the present invention is preferably formed from strip metal stock having horizontally spaced, centrally positioned, elongated, narrow slots therein leaving borders along the marginal edges of the stock. Cuts are provided transversely through the borders at alternate slots.

The stock is thereafter preferably bent into an elongated U-shaped configuration with the cut marginal edges forming the leg portions of the U. The bight portion of the U is formed to provide ring contacting shoulders axially outward from the leg portions of the U.

Portions of the leg segments between the cuts are then bent across the channel of the U, thus providing axially upright fingers blocking the channel. The channel closing fingers may be bent in various ways from either of the legs of the U or from both of the legs or alternatingly from one leg and then from the other. The fingers are preferably of such a length so as to extend from one leg of the U to the other, thus completey blocking the channel at that point and providing axial rigidity to the legs of the U.

It is then an important object of this invention to provide an expander-spacer ring of U-shaped configuration with the channel of the U closed.

Another object of this invention is to provide an expander-spacer ring of U-shaped configuration with axially upstanding fingers between the legs of the U closing the channel between the legs.

A further object of this invention is to provide an expander-spacer ring of substantially U-shaped configuration with circumferentially spaced axially upstanding fingers between the legs of the U blocking the channel of the U at circumferentially spaced points while imparting axial rigidity to the legs of the U.

A still further object of the invention is to provide an expander-spacer ring for use in internal combustion engines of substantially U-shaped configuration and having segmented, axially spaced legs, portions of which are bent to provide circumferentially spaced axially upstanding fingers extending between the segments of one leg and segments of the other, closing the channel of the U at circumferentially spaced points and providing axial rigidity to the segmented legs of the ring.

Many other objects and features of the invention will be apparent from the following description and appended claims.

BRIEF DESCRIPTION OF THE DRAWINGS

FIGURE 1 is a plan view of a packing ring assembly embodying the principles of the present invention with portions thereof broken away to illustrate underlying portions thereof;

FIGURE 2 is a fragmental enlarged cross-sectional view of the packing ring assembly shown in a ring groove of a piston or the like and reciprocally disposed within a cylinder with the cross-section of the expander-spacer ring taken substantially along the line II—II of FIGURE 3;

FIGURE 3 is a fragmental perspective view of an expander-spacer ring embodying the principles of the present invention;

FIGURE 4 is a fragmental perspective view of an expander-spacer ring embodying another form of the principles of the present invention;

DESCRIPTION OF PREFFERRED EMBODIMENTS

Figure 5:
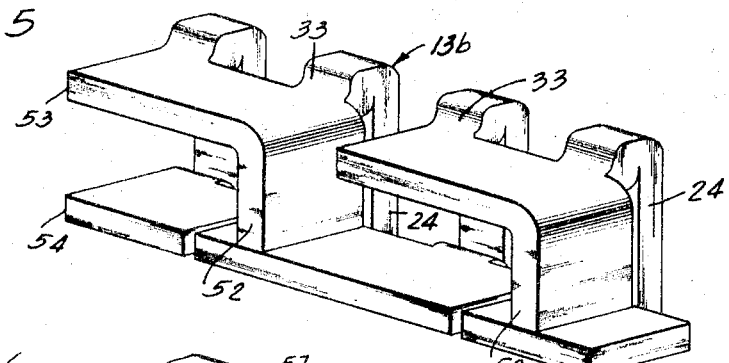
FIGURE 5 is a fragmental perspective view of an expander-spacer ring embodying yet another form of the principles of the present invention.

As shown in FIGURE 1, the piston ring assembly 10 of this invention consists of a top thin flat split metal rail ring 11, an identical bottom rail ring 12 and an intermediate combination circumferential expander and spacer ring 13. Each of the rail rings 11 and 12 has a radial gap or split 14 and 15 which allows the ring to be circumferentially expanded.

As shown in FIGURE 2, the piston ring assembly 10 is disposed in the ring groove 16 of a piston 17 which is reciprocally positioned within a cylinder 18.

The expander-spacer ring 13 resiliently urges the thin rail rings 11 and 12 into sealing engagement with the upper and lower radial faces or sides 19 and 20 of the ring groove 16. At the same time, the expander-spacer ring 13 urges the thin rail rings 11 and 12 into sealing engagement against the face 21 of the cylinder 18.

The assembly 10 is especially useful as an oil control ring in the bottom or oil groove of an internal combustion engine piston and accommodates free oil drainage.

The expander-spacer ring 13 consists of two axially spaced rows 22 and 23 of circumferentially spaced leg segments which are integrally connected along their inner peripheries to axially upright cross bars 24.

The upright cross bars 24 are spaced circumferentially around the inner periphery of the expander-spacer ring 13 and connect the leg segments of the axially spaced rows 22 and 23 in staggered relation with each leg segment in one row having two cross bars integrally connected with it while each of these cross bars is integrally connected with one of two adjacent leg segments in the other row, thus leaving the material of the expander-spacer ring continuous through a zig-zag pattern throughout its circumference except at the ends 25 which are abutted together as shown in FIG. 1.

This alternate connecting of the cross bars and leg segments is shown in FIG. 3. The leg segment 26 of row 23 is integrally connected to two upright cross bars 27 and 28. The upright cross bar 27 is also integrally connected to the leg segment 29 of row 22 while the upright cross bar 28 is integrally connected with the leg segment 30 of row 22.

The upper and lower margins of the cross bars 24 extend axially beyond the planes of the rows 22 and 23 of leg segments. The cross bars 24 are integrally joined with the leg segments through reverse bends 31 and 32 or the like. The reverse bends provide abutment shoulders 33 and 34 axially beyond the plane of the leg segments and along the inner periphery of the rows 22 and 23 of leg segments.

The abutment shoulders 33 and 34 are sloped radially inward and axially outward, preferably at an angle of about 5° to 15°.

The rail rings 11 and 12 are supported and axially separated by the rows 22 and 23 of leg segments. The inner peripheries of the rail rings 11 and 12 abut the abutment shoulders 33 and 34. The resilient circumferential expansion force of the expander-spacer ring 13 is transmitted to the rail rings 11 and 12 at the point of abutment with the abutment shoulders 33 and 34, thus urging the rings against the face 21 of the cylinder well 18. Due to the slope of the abutment faces 33 and 34, the rail rings 11 and 12 are also resiliently urged against the upper and lower radial faces 19 and 20 of the ring groove 16 in substantially sealing relation therewith.

Figure 7:
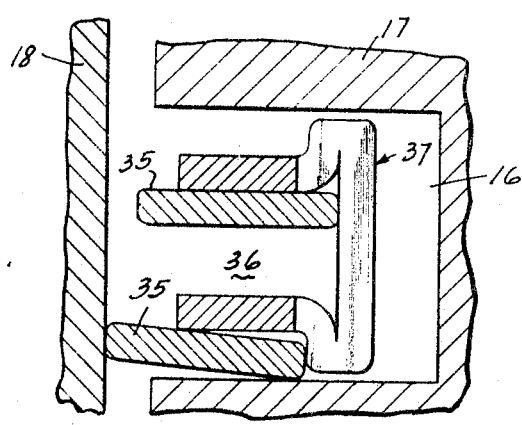
FIGURE 7 is a diagrammatic fragmental cross-sectional view of a prior art packing ring assembly in a ring groove of a piston and showing how a ring of the assembly can enter the channel of the expander-spacer and permit the assembly to be improperly installed in the cylinder.

In order for the expander-spacer ring to urge the rail rings into correct sealing engagement against the face of the cylinder wall and against the upper and lower radial faces of the ring groove, the rail rings must contact the abutment shoulders which extend beyond the plane of the rows of leg segments. During installation of the assembly into a ring groove, it is possible for one or both of the rail rings to slip into the open channel of the prior art U-shaped expander-spacer rings. This is diagrammatically illustrated in FIG. 7 which shows a rail ring 35 in the open channel 36 of a prior art U-shaped expander-spacer ring 37. The improper assembly in the ring groove 16 of the piston 17 can be received in the cylinder 18.

In accordance with this invention, to prevent entry of the rail rings into the channel of the U-shaped expander-spacer ring of this invention and to rigidify the rows of leg segments of the ring against axial collapse, portions of the leg segments are formed into axially upstanding fingers spanning the channel.

In one embodiment of the present invention shown in FIGS. 1 to 3, fingers 38 depend from the leg segments of row 22 across the open end of the channel between the rows 22 and 23 and may be bottomed on the leg segments of row 23. The fingers 38 are formed from outer end portions of the segments by cut 39 parallel with the outer edge of the segments and extending circumferentially from one end of each segment to a depth sufficient to provide a finger of desired length for blocking the channel. The portion of the leg segment thus separated by the cut is then bent to depend from the leg segment and extend across the channel. The fingers 35 preferably bottom on the leg segments of row 23 to rigidify both rows 22 and 23 of leg segments against collapse and to minimize the flip-flop or paint brush effect of the assembly. The fingers 38 present only thin radial edges and are preferably radially aligned with the cross bars 24 to minimize restriction of the oil flow through the assembly.

Although fingers 38 are shown on each leg segment of row 22, a sufficient channel blocking effect could be obtained by providing a lesser number of fingers leaving some of the leg segments uncut.

Figure 8:
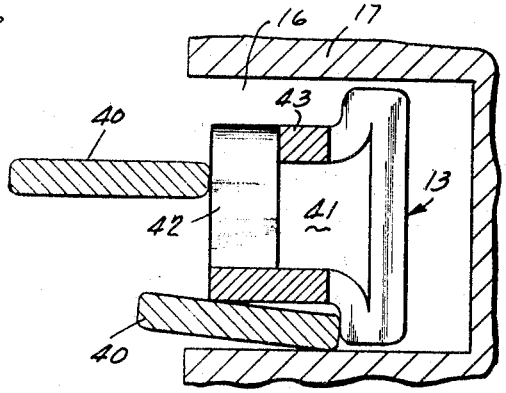
FIGURE 8 is a diagrammatic fragmental cross-sectional view of the packing ring assembly of this invention shown in a ring groove of a piston or the like and showing how the present invention prevents improper installation.

The effect of providing an expander-spacer ring with such channel blocking fingers is diagrammatically illustrated in FIG. 8 which shows a rail ring 40 being prevented from entering the open channel 41 of the U-shaped expander-spacer ring 13 by the finger 42 depending from the leg segment 43 across the channel 41. The other rail ring 40 is shown in its correct position. The assembly cannot be received in the cylinder unless both rings 40 are in proper position. Thus, even in automated engine assembly lines, an improper oil ring assembly of this invention will not be accepted in the cylinder, but prior art assemblies could be accepted.

In the embodiment illustrated in FIG. 4, the modified expander-spacer 13a has fingers provided by segments in both rows. As shown, finger 44 depends from the leg segment 45 in row 46 across the channel and bottoms on the leg segment 47 in row 48. Leg segment 47 in row 48 has no finger depending from it, but the adjacent leg segment 49 of row 48 has a finger 50 depending on it and bottoming on the leg segment 51 of row 46. In this embodiment, the fingers are formed from the axially outer corner at one end of the leg segments in one row and from the axially outer corner of the other end of the leg segments in the other row. In the preferred embodiment, the fingers would depend from alternate leg segments in each of the rows, however, a lesser number of fingers could be provided.

In the embodiment shown in FIG. 5, the modified expander-spacer 13b has fingers 52 formed from full bends of the uncut end portions of the leg segments in row 53. In this embodiment, the fingers, therefore, extend the full radial width of the leg segments. Although the illustration shows the fingers 52 depending from each of the leg segments in row 53 and bottoming on the leg segments in row 54, it is to be understood that a sufficient blockage of the channel can be achieved with fewer fingers and/or without bottoming the fingers on the leg segments in row 54 so long as the gap between the end of the fingers and the leg segments in row 54 is less than the width of the rail rings used in the assembly. It is also to be understood that the embodiments shown in FIG. 5, which consists of a full bend in the leg segment forming the upstanding fingers 52, can be modified in the fashion shown in FIG. 4 wherein the fingers 52 depend from selected leg segments in both rows 53 and 54.

Figure 6:
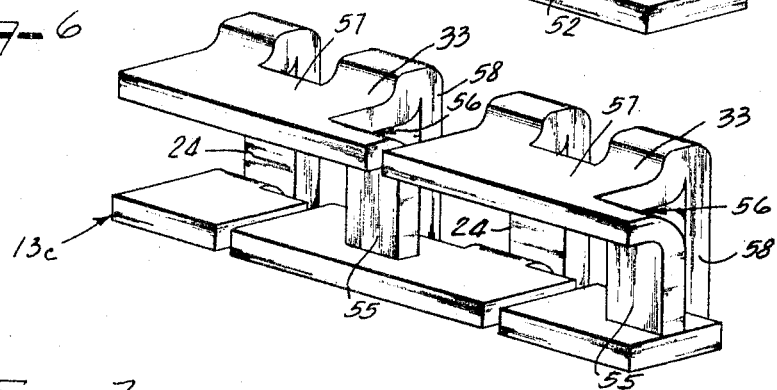
FIGURE 6 is a fragmental perspective view of an expander-spacer ring embodying still another form of the principles of the present invention.

In the embodiment shown in FIG. 6, the expander-spacer 13c has fingers 55 provided by an upward section bend in the material of the leg segments and block the channel radially inward from the outer peripheries of the leg segments. The fingers 55 are formed by radial cuts 56 in the leg segments 57. The radial cuts 56 extend radially outward from the side wall 58 of the cross bars 24. The radial cuts 56 extend radially out from the inner periphery of the leg segments 57 to a depth sufficient to provide a finger of desired length for blocking the channel.

From the above description, it will be understood that our invention provides a piston ring assembly having two axially spaced sealing rings with a circumferential expander-spacer ring therebetween of substantially U-shaped cross-section having circumferentially spaced axially upstanding fingers depending from one or both of the legs of the U, which fingers block the channel of the U either at its radially outer periphery or at some point between its radially outer periphery and its radially inner periphery to prevent entry of the sealing rings into the channel between the radial legs of the expander-spacer ring. It will be understood that our invention also provides that the axially upstanding fingers may completely span the channel of the U and depend from one leg of the expander-spacer ring across the channel between the legs and bottom of the other leg, thereby adding axial rigidity to the expander-spacer ring.

From the foregoing, it would be readily observed that numerous variations and modifications may be effected without departing from the true spirit and scope of the novel concepts and principles of the invention. We, therefore, intend to cover all such modifications and variations as fall within the true spirit and scope of the novel concepts and principles of our invention.

We claim as our invention:

1. A piston ring assembly to resiliently engage the wall of a cylinder or the like comprising: a plurality of axially spaced cylinder engaging rings, a circumferential expander-spacer ring between said cylinder engaging rings of substantially U-shaped cross-section having two radially extending legs and a bight portion forming a radially outwardly opening channel therebetween, circumferential spaced channel blocking means radially spaced from the bight portion of said cross section, said channel blocking means integral with at least one of said radial legs at the outer periphery thereof, each of said means integral with only one of said legs, said means effective to block the radially outwardly opening channel at circumferentially spaced points.

2. The piston ring assembly of claim 1 wherein a plurality of said channel blocking means are integral with one of said radial legs and a plurality of said channel blocking means are integral with the other of said radial legs.

3. A piston ring assembly for disposition in a ring groove of a piston reciprocatably positioned in a cylinder comprising: a pair of split rail rings, an expander-spacer ring disposed between said rail rings to expand the same, said expander-spacer ring being substantially U-shaped in cross-section providing rail supporting legs and an outwardly open channel and formed with axially disposed shoulder portions at the bight thereof engaging inner peripheral portions of the rail rings on the legs, circumferentially spaced axially upstanding fingers depending from at least one of the legs of said U-shaped expander-spacer ring at the outer periphery of the legs, each of said fingers integral with only one of said legs, said fingers closing the channel of the U-shaped expander-spacer ring at circumferentially spaced points and said fingers radially spaced from said bight.

4. A piston ring assembly to resiliently engage the wall of a cylinder or the like comprising a plurality of axially spaced cylinder-engaging rings, an expander ring intermediate said rings, said expander ring including: two axially spaced rows of circumferentially spaced radially extending leg segments, a plurality of axially upstanding circumferentially spaced cross bars formed integrally with an upper and lower leg segment and each of said leg segments being formed integrally with a pair of adjacent cross bars, the leg segments in one of said axially spaced rows in staggered relation with the leg segments in the other of said axially spaced rows whereby an adjacent pair of cross bars are joined together through a single leg segment, the ends of said cross bars extending above and below said axially spaced rows of legs segments, portions of a plurality of said leg segments in at least one of said axially spaced rows formed into axially upstanding circumferentially spaced fingers at the outer periphery of said leg segments, said fingers spaced radially outward from and aligned with said cross bars, and said fingers being of sufficient axial length to substantially span the space between said two axially spaced rows.

5. The expander-spacer ring of claim 4 wherein said axially upstanding circumferentially spaced fingers are of sufficient axial length to span the space between said two axially spaced rows and bottom on leg segments in the other row.

6. The expander-spacer ring of claim 4 wherein said fingers are offset from said cross bars.

References Cited

UNITED STATES PATENTS

| | | | |
|---|---|---|---|
| 2,568,655 | 9/1951 | Olson | 277—200 |
| 2,621,989 | 12/1952 | Norton | 277—200 |
| 2,656,230 | 10/1953 | Phillips | 277—139 |
| 2,664,328 | 12/1953 | Hamm | 277—140 |
| 2,685,484 | 8/1954 | Davis | 267—1.5 |
| 2,817,563 | 12/1957 | Marien | 277—140 |
| 3,355,180 | 11/1967 | Hamm | 277—139 |

FOREIGN PATENTS

| | | |
|---|---|---|
| 881,932 | 11/1961 | Great Britain. |
| 1,079,402 | 4/1960 | Germany. |

LAVERNE D. GEIGER, Primary Examiner

J. S. MEDNICK, Assistant Examiner

U.S. Cl. X.R.

267—1, 141; 277—142